(12) United States Patent
Moriyama et al.

(10) Patent No.: US 6,778,761 B1
(45) Date of Patent: *Aug. 17, 2004

(54) INFORMATION RECORD MEDIUM, APPARATUS FOR RECORDING THE SAME AND APPARATUS FOR REPRODUCING THE SAME

(75) Inventors: Yoshiaki Moriyama, Tsurugashima (JP); Tokihiro Takahashi, Tokorozawa (JP); Hidehiro Ishii, Tokorozawa (JP); Hiroyuki Kurashina, Tokorozawa (JP); Takao Sawabe, Tokyo-to (JP); Junichi Yoshio, Tokorozawa (JP)

(73) Assignee: Pioneer Electronic Corporation, Tokyo-To (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/452,889

(22) Filed: Dec. 2, 1999

(30) Foreign Application Priority Data

Mar. 18, 1996 (JP) .......................................... P08-61472

(51) Int. Cl.⁷ .............................. H04N 5/76; H04N 5/92
(52) U.S. Cl. ............................. 386/96; 386/98; 360/20; 369/48; 369/124
(58) Field of Search .............................. 386/1, 7–8, 33, 386/39, 45–46, 68–82, 96, 95, 98–99, 104–106, 108, 40, 111–112, 124–126; 360/18, 20, 32, 48; 369/47–54, 124; 348/423

(56) References Cited

U.S. PATENT DOCUMENTS 4,627,047 A    12/1986  Pitroda et al.
5,731,852 A     3/1998  Lee
5,758,008 A     5/1998  Tozaki et al.
5,802,245 A     9/1998  Kunihiro
6,014,495 A  *  1/2000  Moriyama et al. ............ 386/96

\* cited by examiner

Primary Examiner—Thai Tran
Assistant Examiner—Christopher Onuaku
(74) Attorney, Agent, or Firm—Morgan, Lewis & Bockius LLP

(57) ABSTRACT

An information recording apparatus (SS1) is provided with: a quantize device (72, 72B) for quantizing record information by 8×n bits; a divide device (72, 72D) for dividing the quantized record information quantized at one quantization timing, into (i) high order bit quantized record information (66), which is a portion at high order 8×m bits of the quantized record information including a predetermined portion of the record information, which must be reproduced at a time of reproducing the record information, and (ii) low order bit quantized record information (67), which is another portion of the quantized record information; a multiplexed record information generation device (72, 72E) for constituting (i) a high order bit quantized record information block (UB) including a plurality of high order bit quantized record informations corresponding to consecutive quantization timings and (ii) a low order bit quantized record information block (DB) including a plurality of low order bit quantized record informations corresponding to the consecutive quantization timings, and for multiplexing the constituted high order bit quantized record information block and the constituted low order bit quantized record information block adjacent to each other to thereby generate multiplexed record information (Sr).

24 Claims, 10 Drawing Sheets

LOGICAL STRUCTRE OF RECORD INFORMATION
(LOGICAL FORMAT)

STRUCTURE OF INTERLEAVED UNIT

IU : INTERLEAVED UNIT

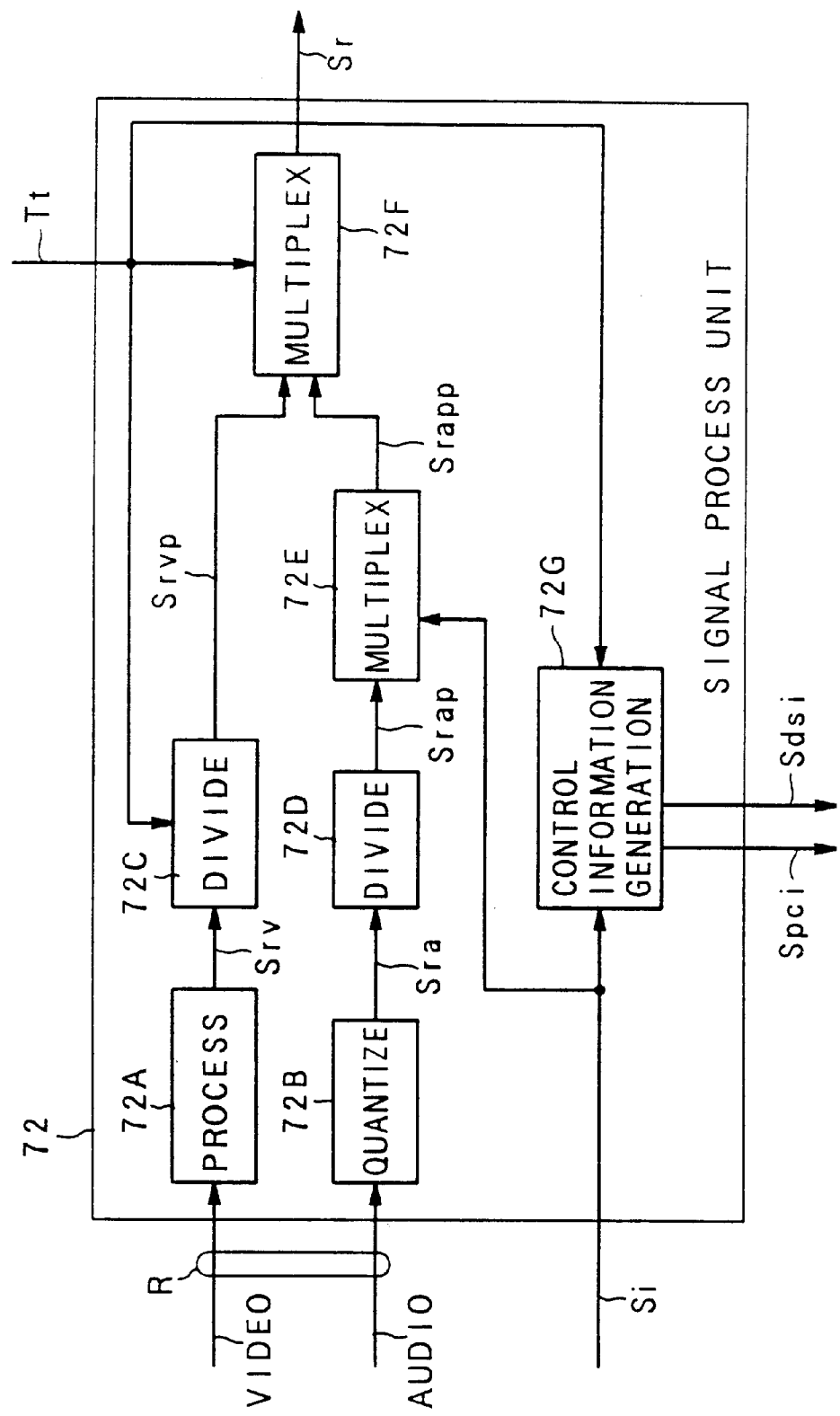

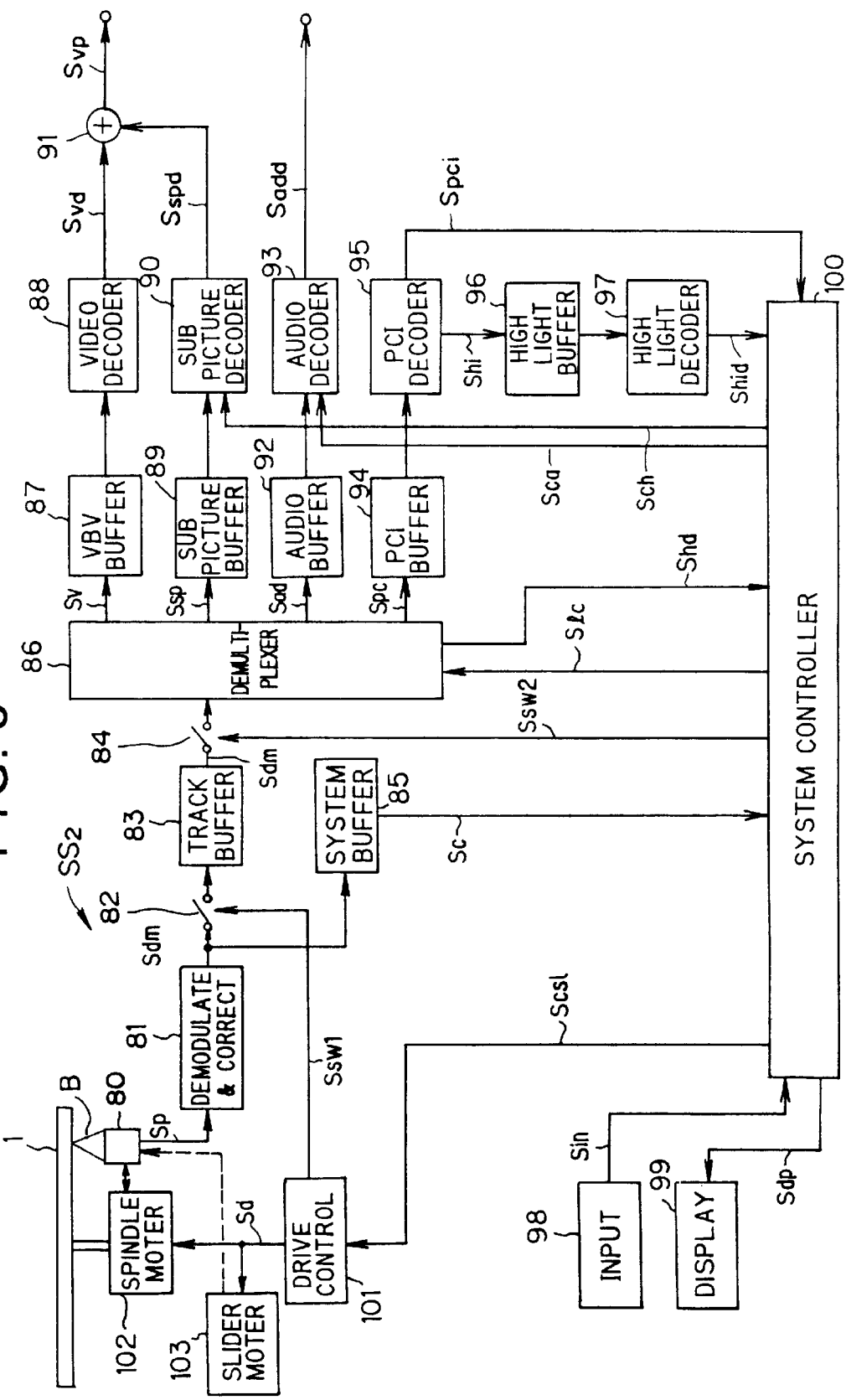

INFORMATION RECORD MEDIUM, APPARATUS FOR RECORDING THE SAME AND APPARATUS FOR REPRODUCING THE SAME

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, there is a problem that, according to the above mentioned LD or the like, a so-called interactive and variegated reproduction is not possible in which the audience can have a plurality of selection branches as for the video or audio information to be displayed or sound-outputted and in which the audience can select them to watch or listen to it.

Namely, for example, in case of giving audience to a foreign movie on the LD, it is not possible to select one of languages to be used for a subtitle (caption) displayed on the picture plane (e.g., select one of the subtitle in Japanese and the subtitle in the original language) so as to display the subtitle in the selected language, or, in case of giving audience to a music recorded on the CD, it is not possible to select one of sound voices of the music (e.g., select one of the English lyric and the Japanese lyric).

On the other hand, various proposals and developments are being made as for the DVD, as an optical disk in which the memory capacity is improved by about ten times without changing the size of the optical disk itself as compared with the aforementioned conventional CD. With respect to this DVD, if a plurality of subtitles in various languages or a plurality of voice sounds in various languages are recorded, the above mentioned interactive and variegated reproduction is possible as the audience selects one of them.

When recording the audio voices in a plurality of different languages, various kinds of musics and the like on the DVD, it is possible to increase the number of bits at a time of digitizing and recording them to thereby record the audio sound and the like with high quality. However, at this time, if trying to make the reproducing apparatus cheaper by utilizing a decoder used in the conventional reproducing apparatus; there may be a case where the decoder does not have a processing capacity corresponding to the number of the bits of the audio sound and the like recorded on the DVD.

In this case, unless the audio sound or the like is recorded in an appropriate recording condition, there may occur a problem that the audio information to be reproduced cannot be reproduced at a time of reproducing by using the cheap reproducing apparatus in which the conventional decoder is utilized.

SUMMARY OF THE INVENTION

It is therefore an object of the present invention to provide: an information recording apparatus, which can record the audio sound etc. in such a manner that the audio sound etc. can be easily reproduced from the DVD etc., by either one of a cheap reproducing apparatus, which is equipped with a decoder having the same function as that of the conventional decoder, and a reproducing apparatus, which is equipped with a high performance decoder dedicated to the DVD etc.; an information record medium, on which the audio sound etc. are recorded by the information recording apparatus in that manner; and an information reproducing apparatus, which can reproduce the audio sound etc. from the information record medium.

The above object of the present invention can be achieved by an information recording apparatus provided with: a quantize device for quantizing record information to be recorded, by 8×n (n is a natural number equal to or more than 2) bits at every quantization timing, to thereby output quantized record information; a divide device for dividing the quantized record information quantized at one quantization timing, into (i) high order bit quantized record information, which is a portion at high order 8×m (m<n, and m is a natural number) bits of the quantized record information including a predetermined portion of the record information, which must be reproduced at a time of reproducing the record information, among the quantized record information quantized at the one quantization timing, and (ii) low order bit quantized record information, which is another portion of the quantized record information other than the high order bit quantized record information among the quantized record information quantized at the one quantization timing; a multiplexed record information generation device for constituting, on the basis of the divided high order bit quantized record information and the divided low order bit quantized record information, (i) a high order bit quantized record information block including a plurality of high order bit quantized record informations corresponding to consecutive quantization timings and (ii) a low order bit quantized record information block including a plurality of low order bit quantized record informations corresponding to the consecutive quantization timings, to which the high order bit quantized record informations constituting the high order bit quantized record information block correspond, and for multiplexing the constituted high order bit quantized record information block and the constituted low order bit quantized record information block adjacent to each other to thereby generate multiplexed record information; and a record device, such as a mastering device etc., for recording the multiplexed record information onto an information record medium such as the DVD or the like.

According to the information recording apparatus of the present invention, the record information is quantized by 8×n (n is a natural number equal to or more than 2) bits at every quantization timing, and the quantized record information is outputted by the quantize device. Then, the quantized record information quantized at one quantization timing is divided, by the divide device, into the high order bit quantized record information and the low order bit quantized record information. After that, on the basis of the divided high order bit quantized record information and the divided low order bit quantized record information, the high order bit quantized record information block and the low order bit quantized record information block are constituted, and the constituted high order bit quantized record information block and the constituted low order bit quantized record information block are multiplexed adjacent to each other, so that the multiplexed record information is generated by the multiplexed record information generation device. Finally, the multiplexed record information is recorded onto the information record medium, such as the DVD or the like, by the record device, such as a mastering device etc.

In this manner, the record information is divided into the high order bit quantized record information at the high order 8×m bits including the record information which must be reproduced at a time of reproducing and the low order bit quantized record information other than it, and the high order bit quantized record information block and the low order bit quantized record information block are constituted respectively by a plurality of high order bit quantized record informations and a plurality of low order bit quantized record informations, in the record information recorded on the information record medium. Therefore, at a time of reproducing the record information, it is possible to extract only the high order bit quantized record information block to thereby perform the reproduction process for the high order bit quantized record information included therein.

As a result, the record information can be easily reproduced by the information reproducing apparatus equipped with a reproduction process device, which can perform only the reproduction process corresponding to the number of bits of the high order bit quantized record information.

Further, even the information reproducing apparatus equipped with a reproduction process device, which can perform the reproduction process corresponding to the number of total bits of the high order bit quantized record information block and the low order bit quantized record information block, can extract the high order bit quantized record information and the low order bit quantized record information respectively to thereby easily perform the reproduction process with the corresponding high order bit quantized record information and low order bit quantized record information in one pair. As a result, it is possible to easily perform the reproduction of the record information.

In one aspect of the information recording apparatus of the present invention, the record information comprises audio information. The quantize device quantizes the record information by 24 bits. And that, the divide device prescribes a portion at high order 16 bits of the quantized record information, which is quantized at the one quantization timing, as the high order bit quantized record information, and prescribes a portion at low order 8 bits of the quantized record information, which is quantized at the one quantization timing, as the low order bit quantized record information.

According to this aspect, since each of the quantized record information, the high order bit quantized record information and the low order bit quantized-record information has the number of bits equal to the integer multiple of 8, the process can be simplified in the 8 bits digital signal process.

In another aspect of the information recording apparatus of the present invention, the multiplexed record information generation device constitutes the high order bit quantized record information block of two high order bit quantized record informations corresponding to consecutive two quantization timings, and also constitutes the low order bit quantized record information block of two low order bit quantized record informations corresponding to the consecutive two quantization timings, to which the two high order bit quantized record informations constituting the high order bit quantized record information block correspond.

According to this aspect, at a time of reproducing the record information by an information reproducing apparatus equipped with a reproduction process device having a process capability of the number of total bits of the high order bit quantized record information block and the low order bit quantized record information block, it is possible to reduce a memory capacity required for synthesizing the high order bit quantized record information and the low order bit quantized record information.

Further, since both of the high order bit quantized record information block and the low order bit quantized record information block have sizes of the integer multiples of 8 irrespective of the number of information samples of the record information quantized at one quantization timing, the digital signal process can be made even easier.

The above object of the present invention can be also achieved by an information record medium such as the DVD or the like, on which record information to be reproduced by an information reproducing apparatus provided with at least a detection device for detecting the record information recorded on the information record medium and a reproduction process device for performing a reproduction process of the detected record information. In the information record medium, the record information is quantized by 8×n (n is a natural number equal to or more than 2) bits at every quantization timing. The quantized record information quantized at one quantization timing, is divided into (i) high order bit quantized record information, which is a portion at high order 8×m (m<n, and m is a natural number) bits of the quantized record information including a predetermined portion of the record information, which must be reproduced at a time of reproducing the record information, among the quantized record information quantized at the one quantization timing, and (ii) low order bit quantized record information, which is another portion of the quantized record information other than the high order bit quantized record information among the quantized record information quantized at the one quantization timing. (i) A high order bit quantized record information block including a plurality of high order bit quantized record informations corresponding to consecutive quantization timings and (ii) a low order bit quantized record information block including a plurality of low order bit quantized record informations corresponding to the consecutive quantization timings, to which the high order bit quantized record informations constituting the high order bit quantized record information block correspond, are constituted. And that, the constituted high order bit quantized record information block and the constituted low order bit quantized record information block are multiplexed adjacent to each other.

According to the information record medium of the present invention, the record information is divided into the high order bit quantized record information at the high order 8×m bits including the record information which must be reproduced at a time of reproducing and the low order bit quantized record information other than it, and the high order bit quantized record information block and the low order bit quantized record information block are constituted respectively by a plurality of high order bit quantized record informations and a plurality of low order bit quantized record informations.

Therefore, at a time of reproducing the record information, it is possible to extract only the high order bit quantized record information block to thereby perform the reproduction process for the high order bit quantized record information included therein.

As a result, the record information can be easily reproduced by the information reproducing apparatus equipped with a reproduction process device, which can perform only the reproduction process corresponding to the number of bits of the high order bit quantized record information.

Further, even the information reproducing apparatus equipped with a reproduction process device, which can perform the reproduction process corresponding to the number of total bits of the high order bit quantized record information block and the low order bit quantized record information block, can extract the high order bit quantized record information and the low order bit quantized record information respectively to thereby easily perform the reproduction process with the corresponding high order bit quantized record information and low order bit quantized record information in one pair. As a result, it is possible to easily perform the reproduction of the record information.

In one aspect of the information record medium of the present invention, the record information comprises audio information. The record information is quantized by 24bits. And that, a portion at high order 16 bits of the quantized record information, which is quantized at the one quantization timing, is prescribed as the high order bit quantized record information, and a portion at low order 8 bits of the quantized record information, which is quantized at the one quantization timing, is prescribed as the low order bit quantized record information.

According to this aspect, since each of the quantized record information, the high order bit quantized record information and the low order bit quantized record information has the number of bits equal to the integer multiple of 8, the process can be simplified in the 8 bits digital signal process.

In another aspect of the information record medium of the present invention, the high order bit quantized record information block is constituted of two high order bit quantized record informations corresponding to consecutive two quantization timings, and the low order bit quantized record information block is constituted of two low order bit quantized record informations corresponding to the consecutive two quantization timings, to which the two high order bit quantized record informations constituting the high order bit quantized record information block correspond.

According to this aspect, at a time of reproducing the record information by an information reproducing apparatus equipped with a reproduction process device having a process capability of the number of total bits of the high order bit quantized record information block and the low order bit quantized record information block, it is possible to reduce a memory capacity required for synthesizing the high order bit quantized record information and the low order bit quantized record information.

Further, since both of the high order bit quantized record information block and the low order bit quantized record information block have sizes of the integer multiples of 8 irrespective of the number of information samples of the record information quantized at one quantization timing, the digital signal process can be made even easier.

The above object of the present invention can be also achieved by a first information reproducing apparatus for reproducing record information from the above described information record medium of the present invention. The first information reproducing apparatus is provided with: a detection and demodulation device for detecting and demodulating the multiplexed record information from the information record medium to thereby output a demodulation signal; a record information block extract device for extracting only the high order bit quantized record information block from the demodulation signal; and a reproduction process device for performing a reproduction process of the high order bit quantized record information included in the extracted high order bit quantized record information block to thereby output the record information.

According to the first information reproducing apparatus of the present invention, the multiplexed record information is detected and demodulated from the information record medium, and the demodulation signal is outputted by the detection and demodulation device. Then, only the high order bit quantized record information block is extracted from the demodulation signal, by the record information block extract device. Then, the reproduction process of the high order bit quantized record information included in the extracted high order bit quantized record information block is performed, and the record information is outputted by the reproduction process device.

Therefore, in case that the reproduction process device has the process capability of performing only the number of bits of the high order bit quantized record information, it is possible to extract only the high order bit quantized record information block to thereby perform the reproduction process for the high order bit quantized record information included therein.

As a result, the record information can be easily reproduced by the information reproducing apparatus equipped with a reproduction process device, which can perform only the reproduction process corresponding to the number of bits of the high order bit quantized record information.

In one aspect of the first information reproducing apparatus of the present invention, the record information comprises audio information. The record information is quantized by 24 bits. A portion at high order 16 bits of the quantized record information, which is quantized at the one quantization timing, is prescribed as the high order bit quantized record information, and a portion at low order 8 bits of the quantized record information, which is quantized at the one quantization timing, is prescribed as the low order bit quantized record information. And that, the reproduction process device performs the reproduction process of the portion at the high order 16 bits of the quantized record information.

According to this aspect, since each of the quantized record information, the high order bit quantized record information and the low order bit quantized record information has the number of bits equal to the integer multiple of 8, the process can be simplified in the 8 bits digital signal process.

In another aspect of the first information reproducing of the present invention, the high order bit quantized record information block is constituted of two high order bit quantized record informations corresponding to consecutive two quantization timings, and the low order bit quantized record information block is constituted of two low order bit quantized record informations corresponding to the consecutive two quantization timings, to which the two high order bit quantized record informations constituting the high order bit quantized record information block correspond. And that, the record information block extract device extracts the two high order bit quantized record informations as the high order bit quantized record information block.

According to this aspect, since both of the high order bit quantized record information block and the low order bit quantized record information block have sizes of the integer multiples of 8 irrespective of the number of information samples of the record information quantized at one quantization timing, the digital signal process can be made even easier.

The above object of the present invention can be also achieved by a second information reproducing apparatus for reproducing record information from the above described information record medium of the present invention. The second information reproducing apparatus is provided with: a detection and demodulation device for detecting and demodulating the multiplexed record information from the information record medium to thereby output a demodulation signal; a record information block extract device for extracting the high order bit quantized record information block and the low order bit quantized record information block from the demodulation signal; a quantized record information extract device for extracting the high order bit quantized record information and the low order bit quantized record information, which corresponds to the high order bit quantized record information, from the extracted high order bit quantized record information block and the extracted low order bit quantized record information block respectively; and a reproduction process device for synthesizing and performing a reproduction process of the extracted high order bit quantized record information and the extracted low order bit quantized record information to thereby output the record information.

According to the second information reproducing apparatus of the present invention, the multiplexed record information is detected and demodulated from the information record medium, and the demodulation signal is outputted by the detection and demodulation device. Then, the high order bit quantized record information block and the low order bit quantized record information block are extracted respectively from the demodulation signal, by the record information block extract device. Then, the high order bit quantized record information and the low order bit quantized record information are extracted from the extracted high order bit quantized record information block and the extracted low order bit quantized record information block respectively, by the quantized record information extract device. Finally, the extracted high order bit quantized record information and the extracted low order bit quantized record information are synthesized and the reproduction process of it is performed, and the record information is outputted by the reproduction process device.

Therefore, it is possible to extract both of the high order bit quantized record information and the low order bit quantized record information, to thereby easily perform the reproduction process with the corresponding high order bit quantized record information and low order bit quantized record information in one pair, As a result, it is possible to easily perform the reproduction of the record information.

In one aspect of the second information reproducing apparatus of the present invention, the record information comprises audio information. The record information is quantized by 24bits. A portion at high order 16 bits of the quantized record information, which is quantized at the one quantization timing, is prescribed as the high order bit quantized record information, and a portion at low order 8 bits of the quantized record information, which is quantized at the one quantization timing, is prescribed as the low order bit quantized record information. And that, the quantized record information extract device extracts the portion at the high order 16 bits of the quantized record information as the high order bit quantized record information, and extract the portion at the lower order 8 bits of the quantized record information as the low order bit quantized record information.

According to this aspect, since each of the quantized record information, the high order bit quantized record information and the low order bit quantized record information has the number of bits equal to the integer multiple of 8, the process can be simplified in the 8 bits digital signal process.

In another aspect of the second information reproducing apparatus of the present invention, the high order bit quantized record information block is constituted of two high order bit quantized record informations corresponding to consecutive two quantization timings, and the low order bit quantized record information block is constituted of two low order bit quantized record informations corresponding to the consecutive two quantization timings, to which the two high order bit quantized record informations constituting the high order bit quantized record information block correspond. And that, the record information block extract device extracts the two high order bit quantized record informations and the two low order bit quantized record informations.

According to this aspect, in the-information reproducing apparatus equipped with a reproduction process device having a process capability of the number of total bits of the high order bit quantized record information block and the low order bit quantized record information block, it is possible to reduce a memory capacity required for synthesizing the high order bit quantized record information and the low order bit quantized record information.

Further, since both of the high order bit quantized record information block and the low order bit quantized record information block have sizes of the integer multiples of 8 irrespective of the number of information samples of the record information quantized at one quantization timing, the digital signal process can be made even easier.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 7 is a block diagram showing a detailed construction of a signal process unit of the recording apparatus of the embodiment;

FIG. 8 is a block diagram of a reproducing apparatus as another embodiment of the present invention;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

| | |
|---|---|
| high order bit quantized record information: | high order bit data |
| low order bit quantized record information: | low order bit data |
| high order bit quantized record information block: | high order bit data block |
| low order bit quantized record information block: | low order bit data block |

(I) Embodiment of Information Record Medium

First of all, a physical structure and a logical structure as well as an operation of a DVD, as one embodiment of the information record medium to which the present invention is applied, will be explained with reference to FIGS. 1 to 5.

Figure 1:
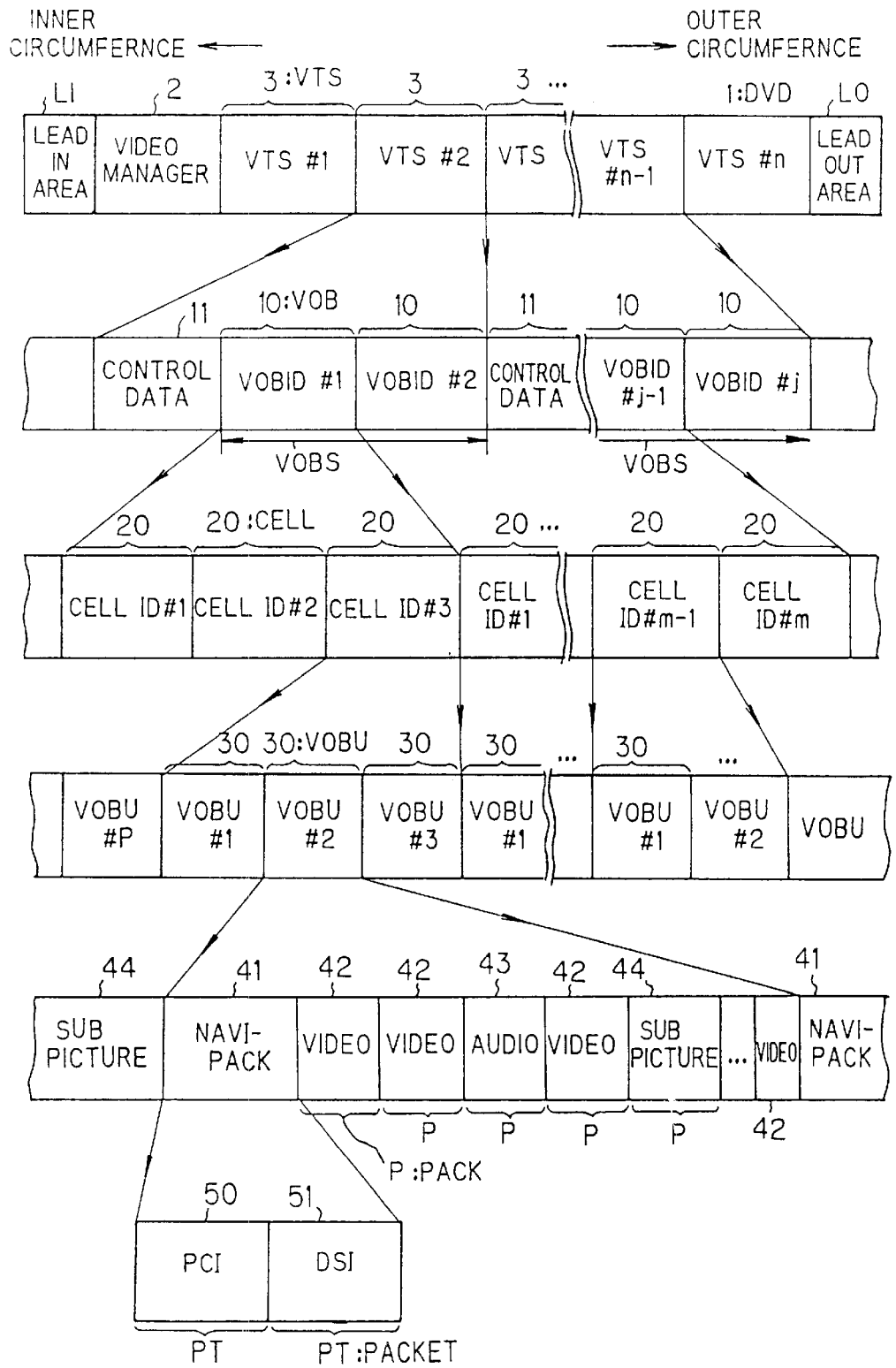
FIG. 1 is a diagram showing a physical structure of record information of a DVD as one embodiment of the present invention.

At first, a record format of video information and audio information on the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of the audio information and sub picture information included therein, is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for showing a name of each title, information for preventing an illegal copy, an access table for accessing each title and so on, is recorded.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes at least one of the video information, the audio information and sub picture information (which is defined as information of a sub picture such as a subtitle of a movie etc.), or each of which includes only a navi(navigation)-pack described later.

One VOB unit 30 is provided with: a navi-pack (a navigation pack) 41 for storing control information to control the video information etc. included in the pertinent VOB unit 30, as a control object; a video data 42 as the video information; an audio data 43 as the audio information; and a sub picture data 44 as the sub picture information. Here, in a pack P for the video data 42, only the video data is recorded. In a pack P for the audio data 43, only the audio data is recorded. Further, in a pack P for the sub picture data 44, only graphic data of a character, a diagram or the like as the sub picture, is recorded. In the video packs 42, which data amount is relatively large as shown in FIG. 1, one or a plurality of GOPs are recorded within one VOB unit 30. The audio data 43 and the sub picture data 44 are disposed intermittently between the video packs 42. It is prescribed by a standard specification of the DVD that there are 8 kinds of audio recordable on the DVD 1 while 32 kinds of sub picture recordable on the DVD 1.

These data are recorded such that the reproduction time corresponding to one VOB unit 30 (i.e. the reproduction time corresponding to the data recorded between one navi-pack 41 and another navi-pack 41 adjacent to said one navi-pack 41) is not shorter than 0.4 seconds.

Further, there always exists the navi-pack 41 in one VOBU 30 at the head thereof. On the other hand, there may not exist each of the video data 42, the audio data 43 and the sub picture data 44 in one VOBU 30, or, even in case that the packs P for these data exist in one VOBU 30, the number of the packs P and the order of the packs P are freely determined.

Here, a division of each of the video data 42, the audio data 43 and the sub picture data 44 as shown in FIG. 1, is called as a pack P. Namely, in one VOB unit 30, the video data 42, the audio data 43 and the sub picture data 44 are divided into packs P respectively and recorded, wherein the pack P in which the video data 42 is recorded is called as a video pack, the pack P in which the audio data 43 is recorded is called as an audio pack, and the pack P in which the sub picture data 44 is recorded is called as a sub picture pack. These packs P are record units set in correspondence with a packing process in the MPEG 2 method, which is employed at the time of recording the record information onto the DVD 1 in the present embodiment.

Further, a reading start time information, which is called as a SCR (System Clock Reference), a start code indicating a start of the pack P and the like are recorded at a pack header recorded at the head of each pack P. This SCR indicates a reading start time on a time axis of reproduction time, at which reading the data included in each pack P from the track buffer in the reproducing apparatus described later and inputting the read data into each buffer are to be started. On the other hand, as for each pack P, the video data 42, the audio data 43 or the sub picture data 44 is recorded in each packet, which is generally a record unit obtained by dividing the pack P more finely. In the DVD 1 of the present embodiment, one pack P consists of one packet PT in general. Namely, the audio data 43 are recorded for each audio packet, which is formed by further dividing the audio pack into pieces, and at least one audio pack includes one audio packet.

Finally, the navi-pack 41 is provided with: a DSI (Data Search Information) data 51 in a packet PT including search information to search a video image or an audio sound desired to be displayed or sound-outputted (concretely, search information such as an address, where the video or audio to be displayed or sound-outputted is recorded, on the DVD 1); and a PCI (Presentation Control Information) data 50 in a packet PT including information related to a display control at a time of displaying the video image or outputting the audio sound, which is searched on the basis of the information of the DSI data 51. Here, the DSI data 51 and the PCI data 50 construct, as the packets PT, a DSI packet and a PCI packet respectively, and then are recorded. Further, all video data 42 included in one VOBU 30 consist of at least one GOP (Group Of Pictures) each having an ID number.

In the PCI data 50, high light information, which defines a display or operation at a time when one selection item is selected out of selection items by the audience, is included. By the high light information, for example, the change of the picture plane display for a selection item as well as the display position to be changed in correspondence with the selection item, on a special picture plane of selection items (i.e. a so-called menu picture plane) for the audience to select, and the command corresponding to the selected item (i.e. a command to be performed in correspondence with the selected item) are set.

Further, the video information to construct and display a frame, a selection button and the like, which is required to construct and display the menu picture plane, is recorded in the sub picture data 44 as the sub picture information.

Information to set a value of a register (memory) in a system controller of a reproducing apparatus described later may be included in the high light information. This point is explained by use of a case where the record information recorded on the DVD 1 is an educational software, for example. Namely, in case of an educational software, there may be a-case where a test question is displayed on a display portion, and then, a plurality of answer candidates may be displayed as selection items for the audience to select, by use of the sub picture data 44. At this time, if the selection item corresponding to the correct answer for the pertinent question is selected by the audience, the system controller adds a predetermined point or score corresponding to the correct answer to a value of the predetermined register included in the system controller, by use of the command information corresponding to the selection items respectively in the high light information, while the system controller does not add the point or score if the selection item corresponding to the incorrect answer is selected. After that, making question and answering are repeated for a predetermined number of questions in the same manner. After finishing all of the answers, the system controller refers to the predetermined register to which the points or scores are accumulated, and, according to other command information (e.g. the command in the PGCI), controls the optical pickup to jump to a record position on the DVD 1 where questions etc. at a next study stage are recorded if the value of the total points is larger than a predetermined value which is set in advance, while controls the optical pickup to jump to a record position where a software for reviewing is recorded if the value of the total points is less than the predetermined value. As in the above explained example, it is possible to set the value of the register in the controller by the high light information.

On the other hand, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Figure 2:
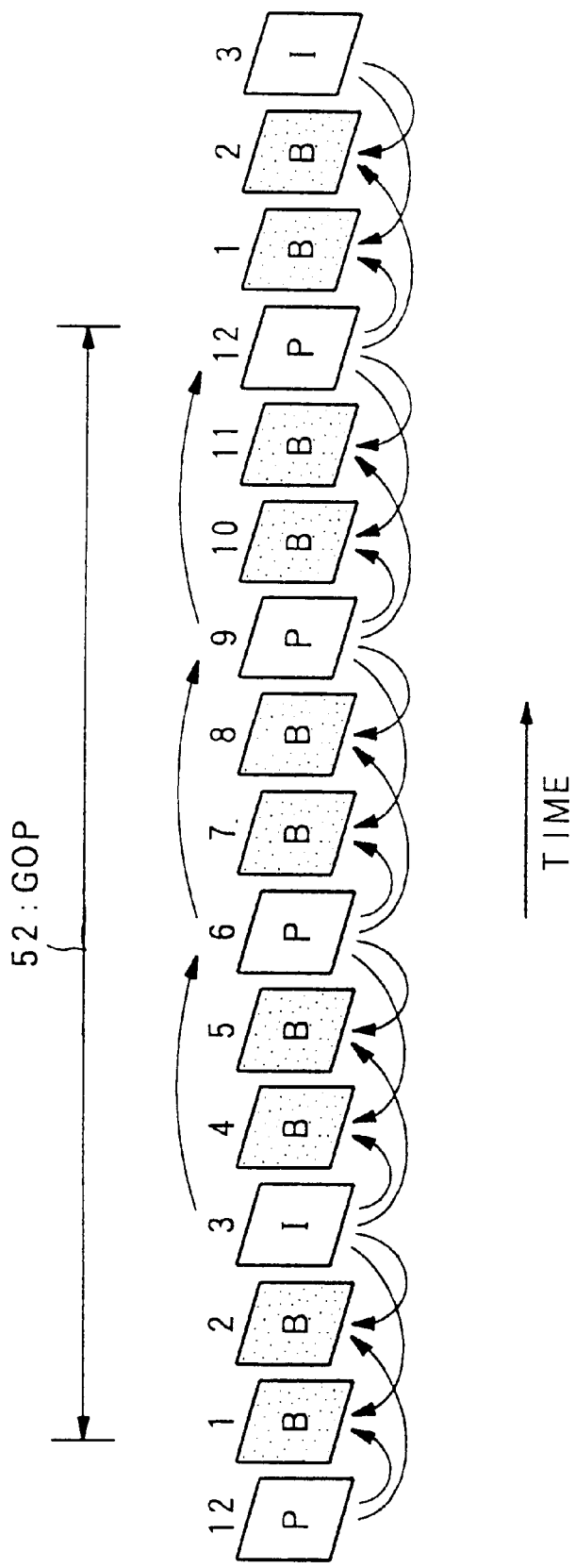
FIG. 2 is a diagram showing frame pictures constructing a GOP.

Further, the scheme of the above explained GOP is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is called as an I picture (Intra-coded picture), which is defined as a frame picture able to be reproduced as a complete frame picture by use of its own picture information. A frame picture indicated by a reference sign "P" is called as a P picture (Predictive-coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective-pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

Next, audio data 43 in the DVD 1 is explained which is the feature of the present invention.

As for the audio data 43 in the DVD 1, there is a case where compressed audio data is recorded, and there is a case where non-compressed audio data is recorded. Among them, the audio data 43 encoded by using a method called as the linear PCM (Pulse Code Modulation) is recorded, as the non-compressed audio data. The physical structure in case of recording the audio data 43 according to this linear PCM method on the DVD 1 is explained with reference to FIG. 3. Incidentally, the audio data 43 according to the linear PCM method in this embodiment is quantized by the number of quantized bits of 24 bits.

Figure 3:
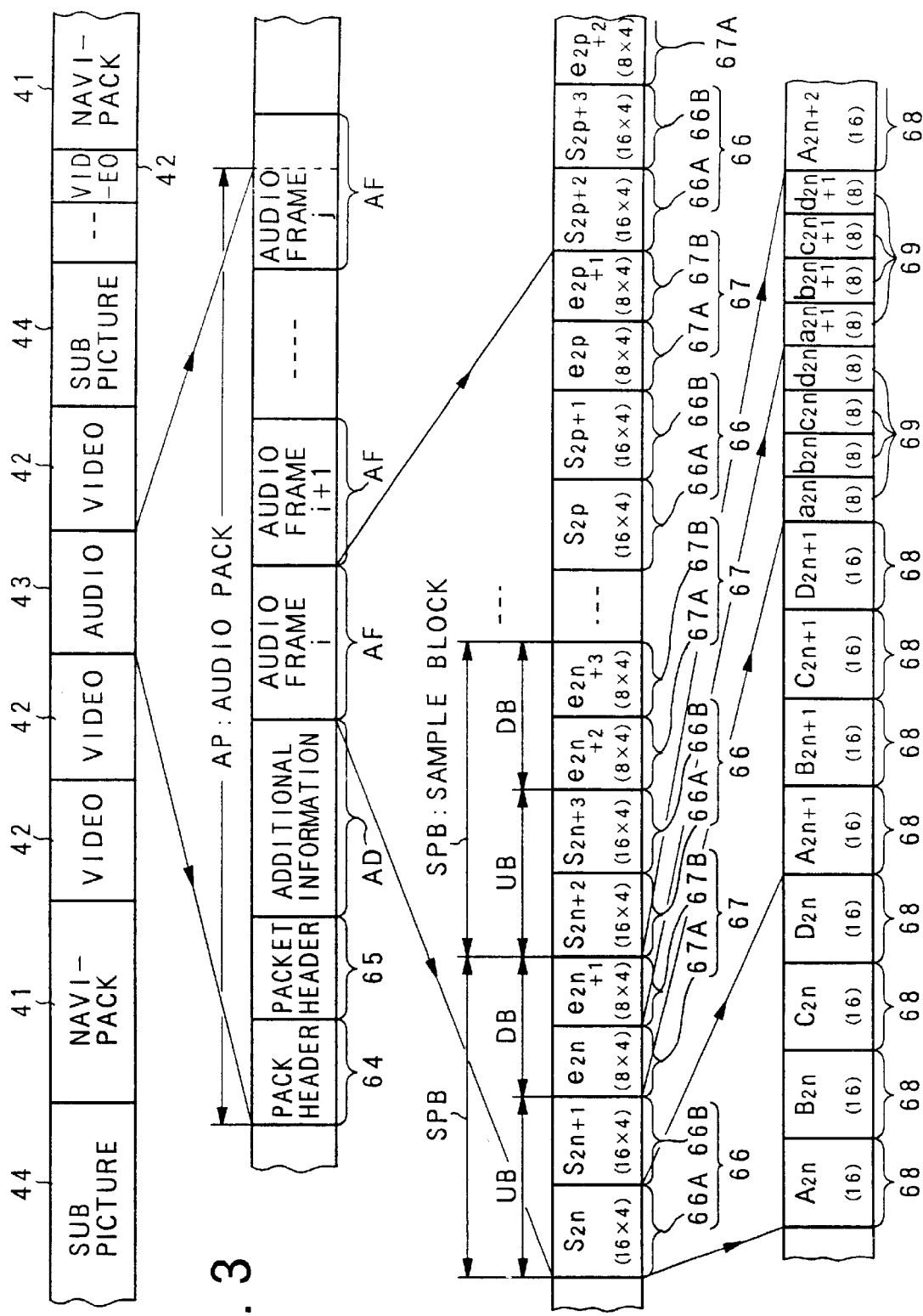
FIG. 3 is a diagram showing a detailed physical structure of audio data in the embodiment.

As shown in FIG. 3, when recording the audio data 43 according to the linear PCM method onto the DVD 1, one audio data 43 (hereafter, referred to as an audio pack AP) is composed of: at a lead portion thereof, a pack header 64 including a start code indicative of a start of the audio pack AP and the above mentioned SCR and the like; a packet header 65 including identification information indicating that data contained in the pertinent audio pack AP is the audio data 43; an additional information AD which is information in relation to the audio data 43 included in the audio pack AP; and a plurality of audio frames AF (i.e. AFi, AFi+1, . . . , AFj) which are reproduction units obtained by dividing the audio data 43 included in the audio pack AP into each portion of the audio data 43 corresponding to a constant reproduction time (for example, ¹⁄₆₀₀ seconds). Here, as the additional information AD, the informations are described, such as the number of quantized bits (24 bits in this embodiment) when quantizing the audio data 43 by using the linear PCM method, a sampling frequency at that time, the number of channels included in the pertinent audio data 43 and the like. Here, as for the number of channels included in the audio data 43, one channel is constituted by the audio data 43 to be outputted by one speaker. More concretely, in a case of including only the audio data 43 to be reproduced by two normal left and right speakers, the number of channels is "2". In a case that the audio data 43 is recorded so as to have the so-called surround effect, the number of channels corresponds to the number of the speakers, for example, 4 channels or the like.

One audio frame AF is composed of the audio data 43 corresponding to the constant reproduction time at a form as indicated below.

That is, one high order data block UB including two high order bit data 66 which are the audio data 43 at each high order 16 bits and one low order data block DB including two low order bit data 67 which are the audio data 43 at each low order 8 bits, among the audio data 43 for each channel quantized by 24 bits at one quantization timing, constitutes one sample block SPB. The sample blocks SPB having the number corresponding to the constant reproduction time are linked to each other to thereby constitute one audio frame AF.

Further, the two high order bit data 66 included in the high order data block UB contain a high order bit data 66A of 16 bits (indicated by $[S_{2n}]$ in FIG. 3) quantized at a quantization timing corresponding to an even number, and a high order bit data 66B of 16 bits (indicated by $[S_{2n+1}]$ in FIG. 3) quantized at a quantization timing corresponding to an odd number, among the quantization timings in the quantization of the linear PCM.

The two low order bit data 67 included in the low order data block DB contain a low order bit data 67A of 8 bits (indicated by $[e_{2n}]$ in FIG. 3) quantized at the quantization timing corresponding to the even number, which is the quantization timing at which the high order bit data 66A is generated, and a low order bit data 67B of 8 bits (indicated by $[e_{2n+1}]$ in FIG. 3) quantized at the quantization timing corresponding to the odd number, which is the quantization timing at which the high order bit data 66B is generated, among the quantization timings in the quantization of the linear PCM. Incidentally, in FIG. 3, the numbers within parentheses in each of the high order bit data 66 and the low order bit data 67 indicate the number of bits of each data.

The high order bit data 66A and the low order bit data 67A constitute the audio data 43 of 24 bits quantized at one quantization timing corresponding to the even number. Further, the high order bit data 66B and the low order bit data 67B constitute the audio data 43 of 24 bits quantized at one quantization timing corresponding to the odd number. Thus, if reproducing by combining the high order bit data 66A with the low order bit data 67A at a time of reproducing, it is possible to reproduce the original audio data 43 quantized by 24 bits. Similarly, if reproducing by combining the high order bit data 66B with the low order bit data 67B at a time of reproducing, it is possible to reproduce the original audio data 43 quantized by 24 bits.

Further, the high order bit data 66 is composed of channel high order bit data 68 for each channel, and the low order bit data 67 is composed of channel low order bit data 69 for each channel, respectively. Incidentally, FIG. 3 shows a state in which four channels are included as channels [A] to [D]. The number within the parentheses in each of the channel high order bit data 68 and the channel low order bit data 69 respectively indicates the number of bits of each data.

In the reproducing apparatus described later in accordance with the present invention, each channel low order bit data 69 is not reproduced in case that an audio decoder has only a process capacity corresponding to 16 bits. In this case, the audio data 43 included in each channel low order bit data 69 is the audio data corresponding to a quantization bit width that does not trouble the hearing even if it is not reproduced. Thus, even if it is not reproduced at a time of reproduction, there is no large problem on the hearing. (By the way, the number of quantized bits in the conventional CD is 16. In the DVD 1 of this embodiment, the number of quantized bits is prescribed to be a maximum of 24 bits, in order to record the audio data 43 having higher quality than the CD).

In the above explained record format having a hierarchical structure as shown in FIG. 1, each division can be freely set according to the author'intention, so as to perform recording on the basis of these'et divisions. By performing the reproduction on the basis of a later described logical structure for each of these divisions, the variegated reproduction can be performed.

Nextly, a logical format (logical structure) constructed by combining the information recorded by the physical divisions shown in FIGS. 1 is explained with reference to FIG. 4. The information is not actually recorded on the DVD 1 in the logical structure of FIG. 4. Instead, information (e.g. access information or time information) to reproduce each data shown in FIGS. 1 by combining them (especially combining the cells 20) in the logical structure shown in FIG. 4, is recorded on the DVD 1, especially in the control data 11.

Figure 4:
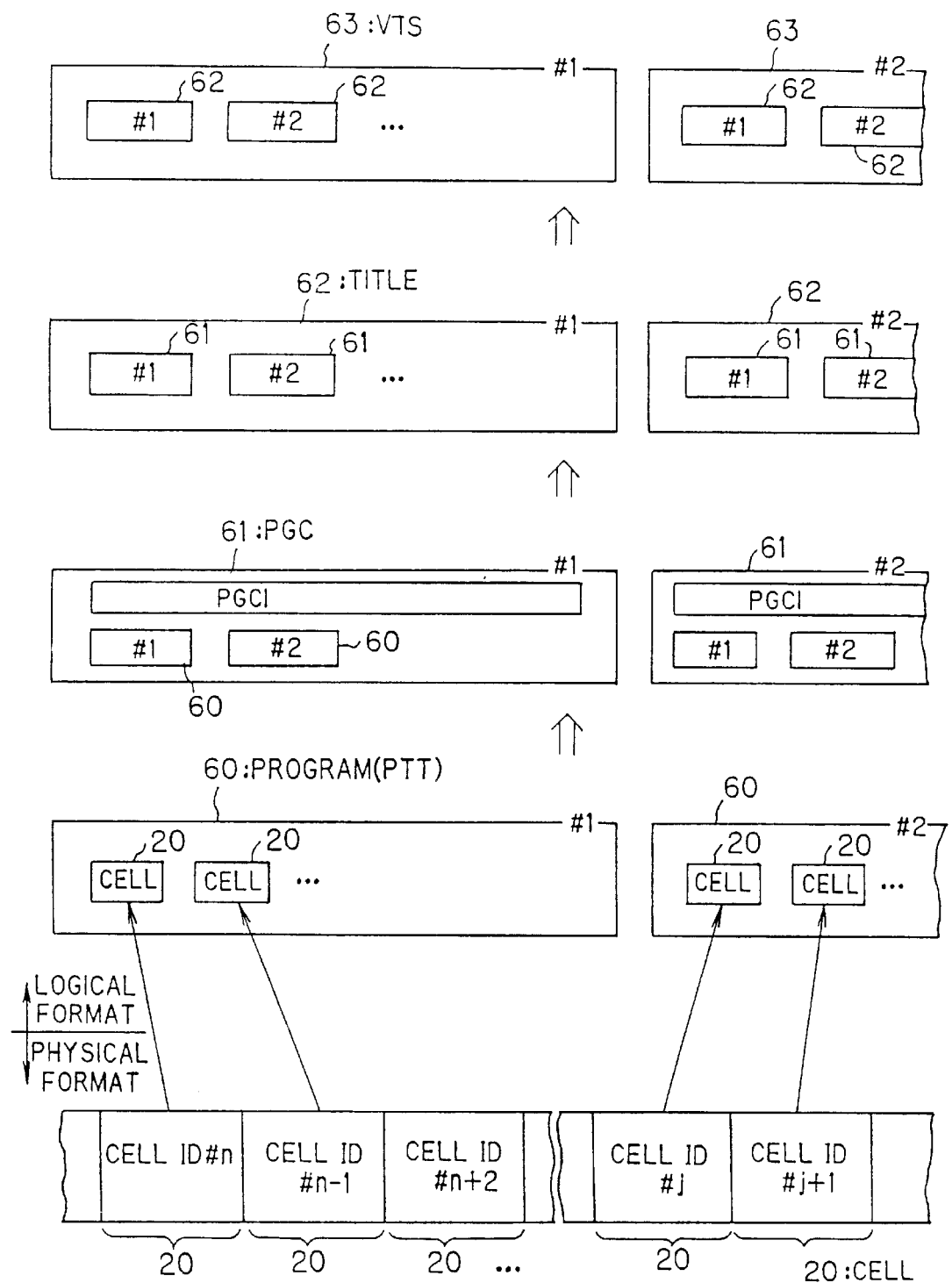
FIG. 4 is a diagram showing a logical structure of the record information of the DVD in FIG. 1.

To make the explanation clear, the following explanation is made from the lower hierarchical layer in FIG. 4. One program 60 is logically constructed on the basis of the author'intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 4, the number is treated as the cell number in the order of description in the PGCI described later.

Next, by combining a plurality of programs 60, one PGC (Program Chain) 61 is logically constructed on the basis of the author'intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC#1, PGC#2, . . . ) as shown in FIG. 3. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 4. The title 62 included in the VTS 63 has the attributes common to each other. For example, the movies based on one movie but in different languages correspond to the respective titles 62. The information included in one VTS 63 shown in FIG. 4 corresponds to information included in one VTS 3 shown in FIG. 1. Namely, all information included in the logical VTS 63 shown in FIG. 4 is recorded as one VTS 3 in the DVD I shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are, recorded in the order of the ID numbers. However, in the DVD 1 of the present embodiment, one cell 20 may be divided into a plurality of interleaved units IU to be actually recorded on the DVD 1, as shown in FIG. 5.

Figure 5:
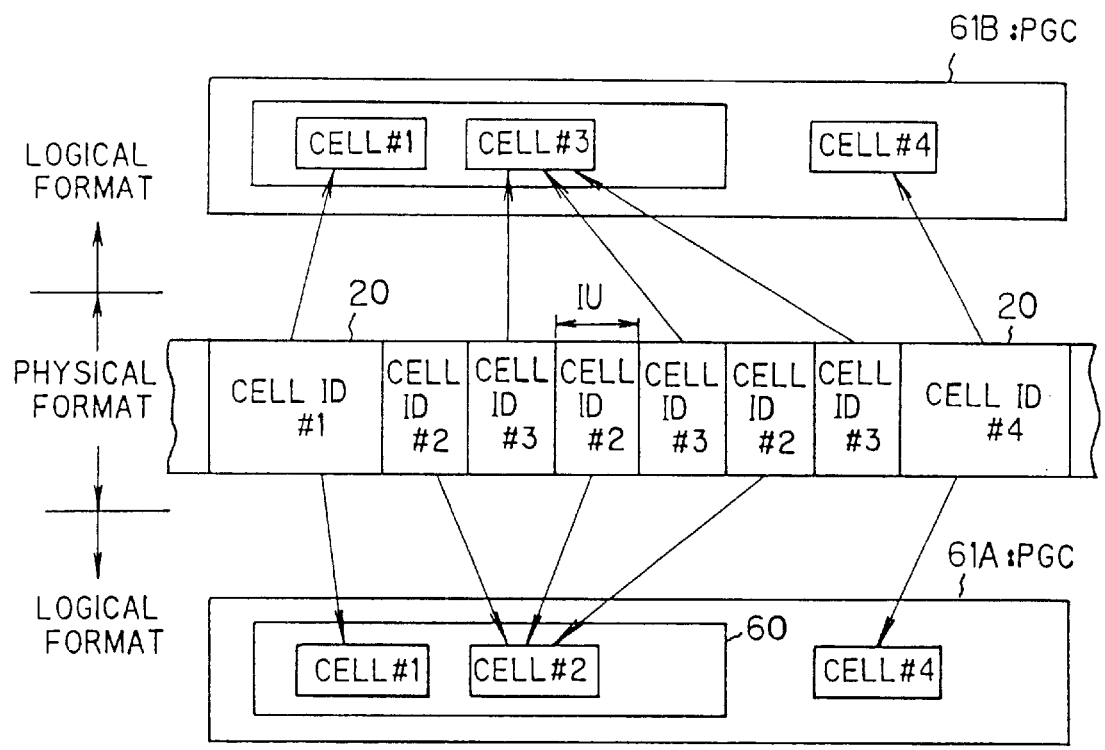
FIG. 5 is a diagram showing a structure of an interleaved unit.

Namely, as shown in FIG. 5, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 5, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at a track buffer of the reproducing apparatus described later(i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author'intention, the signal outputted from the track buffer can be continuous even at a time of reproducing the PGC 61 including the cells 20 having the discontinuous ID numbers, so that it is possible for the audience to watch-continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Since it is necessary to record the information at various hierarchy classes explained above, the record information having the above explained recording format is suitable for an information record medium having a large memory capacity, such as the aforementioned DVD 1, which memory capacity is so large that audio voices or subtitles in various kinds of languages in addition to the movie itself can be recorded on a single optical disk as for the audio voice or subtitle of the movie.

(II) Embodiment of Recording Apparatus

Next, an embodiment of recording apparatus for recording the above mentioned control information, video information and audio information onto the DVD 1 will be explained with reference to FIGS. 6 and 7.

Figure 6:
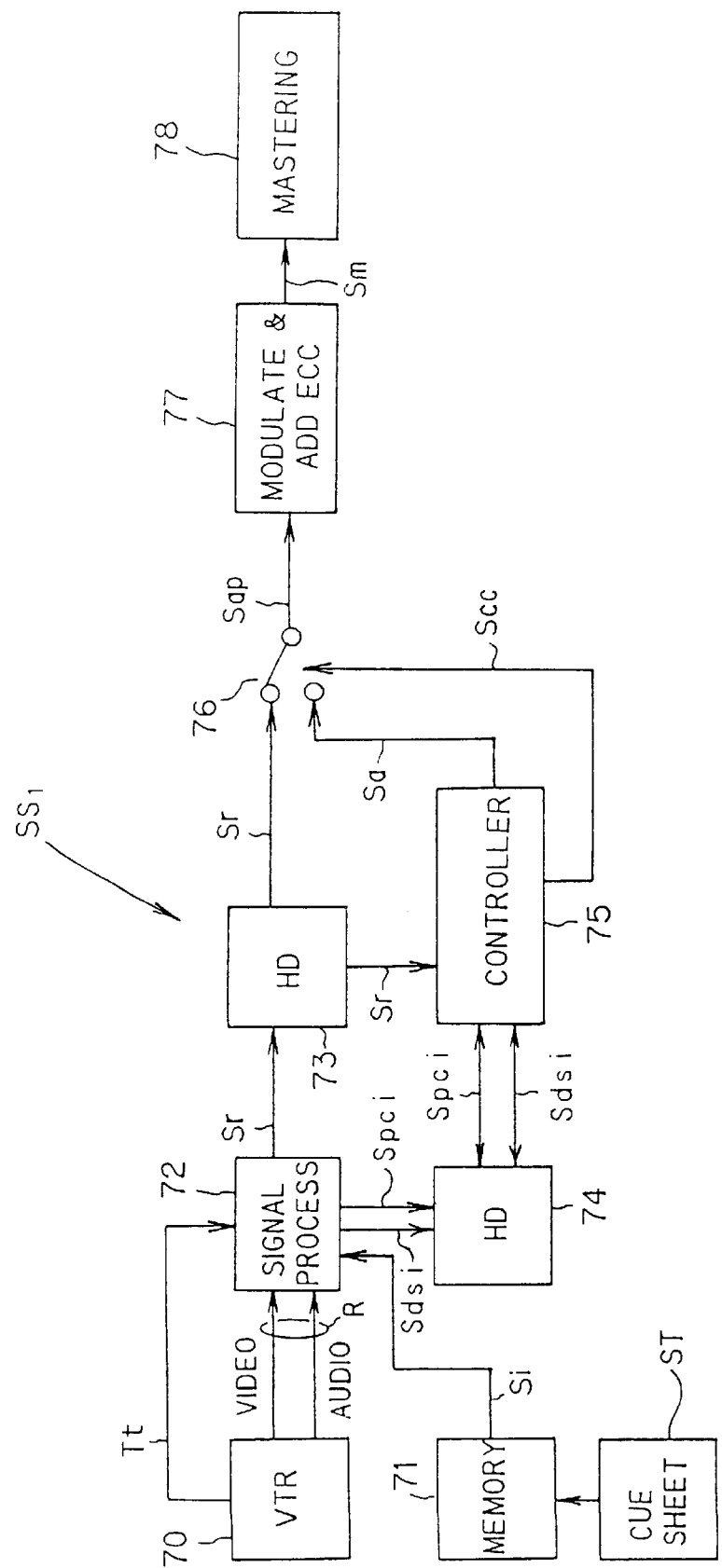
FIG. 6 is a block diagram of a recording apparatus as one embodiment of the present invention.

As shown in FIG. 6, a recording apparatus SS1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

As shown in FIG. 7, a signal process section 72 is provided with a process section 72A, a quantize section 72B as one example of a quantize means, a divide section 72C, a divide section 72D as one example of a divide means, a multiplex section 72E as one example of a multiplex record information generation means, a multiplex section 72F and a control information generating section 72G.

Next, an operation is explained.

A record information R, which is the material of the audio information, the video information or the like to be recorded on the DVD 1, is temporarily recorded on the VTR 70 for each information. The record information R recorded temporarily on the VTR 70 is outputted to the signal process unit 72 for each audio information or video information, based on a request from the signal process unit 72.

The process section 72A in the signal process unit 72 performs the A/D conversion of the inputted video information, and then performs the compressing process by the MPEG 2 method, and outputs a processed video signal Srv composed of the GOPs 52. The divide section 72C divides the processed video signal Srv into video packs (refer to FIG. 1), on the basis of the time code Tt corresponding to the record information R outputted from the VTR 70, to thereby output a divided processed video signal Srvp.

On the other hand, the quantize section 72B in the signal process unit 72 quantizes the inputted audio information by the linear PCM method according to the number of quantized bits of 24 bits, to thereby output a quantized audio signal Sra.

The divide section 72D divides the audio data 43 of 24 bits quantized at each quantization timing included in the quantized audio signal Sra, into the high order bit data 66 at the high order 16 bits and the low order bit data 67 at the low order 8 bits, at each quantization timing, to thereby output a divided quantized audio signal Srap. At this time, the channel high order bit data 68 of 16 bits for each channel is included in the high order bit data 66 in the divided quantized audio signal Srap. Further the channel low order bit data 69 of 8 bits for each channel is included in the low order bit data 67 in the divided quantized audio signal Srap (refer to FIG. 3).

The multiplex section 72E extracts, from the high order bit data 66 and the low order bit data 67 corresponding to each quantization timing included in the outputted divided quantized audio signal Srap, the high order bit data 66A corresponding to the even-numbered quantization timing and the high order bit data 66B corresponding to the odd-numbered quantization timing, and accordingly multiplexes the high order bit data 66A and the high order bit data 66B so as to constitute the high order bit data block UB. The multiplex section 72E also extracts the low order bit data 67A corresponding to the even-numbered quantization timing that is the quantization timing at which the high order bit data 66A is generated and the low order bit data 67B corresponding to the odd-numbered quantization timing that is the quantization timing at which the high order bit data 66B is generated, and accordingly multiplexes the low order bit data 67A and the low order bit data 67B so as to constitute the low order bit data block DB. Further, the multiplex section 72E temporarily stores the high order bit data block UB having the above mentioned structure, and by reading out it as the occasion demands, multiplexes the high order bit data block UB and the low order bit data block DB in such a manner that the high order bit data block UB and the low order bit data block DB are adjacent to each other, to thereby constitute the sample block SPB. Then, the multiplex section 72E lumps a predetermined number of the sample blocks SPB corresponding to the predetermined reproduction time (e.g. 1/600 seconds) together to thereby constitute the audio frame AF, and finally outputs it as a multiplexed quantized audio signal Srapp.

After the audio frame AF is constituted, the additional information AD included in the control signal Si described later is multiplexed together with the pack header 64 and the packet header 65, for each above mentioned predetermined number of sample blocks SPB. Accordingly, one audio pack AP is constituted as shown in FIG. 3. Thus, the multiplexed quantized audio signal Srapp includes a plurality of audio packs AP.

The divided processed video signal Srvp including the video pack outputted by the divide section 72C and the multiplexed quantized audio signal Srapp including the audio pack AP outputted by the multiplex section 72E are multiplexed for each pack, on the basis of the time code Tt, by the multiplex section 72F, and then outputted as a compressed multiplexed signal Sr. After that, the outputted compressed multiplexed signal Sr is temporarily stored in a hard disk device 73. In this compressed multiplexed signal Sr, the video pack and the audio pack AP are in a state multiplexed for each pack, as shown in FIG. 1 or the upper stage of FIG. 3.

Along with this, the memory 71 temporarily stores control information for controlling the reproduction of the record information R (e.g. the video manager 2, the control data 11, the navi-pack 41 including the PCI data 50 and the DSI data 51 and so on), which is inputted beforehand on the basis of a cue sheet ST, on which the control information is written. Then, the memory 71 outputs it as a control information signal Si on the basis of a request from the control information generation section 72G in the signal process unit 72. The additional information AD included in this control information signal. Si is outputted to the multiplex section 72E in the above mentioned manner.

Then, the signal process unit 72 separates or extracts the PCI data 50 and the DSI data 51 from the control information with referring to a time code Tt, and outputs them as respectively corresponding PCI data signal Spci and DSI data signal Sdsi, on the basis of the time code Tt corresponding to the record information R outputted from the VTR 70 and the control information signal Si outputted from the memory 71. Then, the PCI data signal Spci and DSI data signal Sdsi are temporarily stored in the hard disk device 74. At this time, control informations other than the PCI data 50 and the DSI data 51 are, although they are not illustrated in FIGS. 6 and 7, also respectively separated or extracted by the signal process unit 72 in the same manner as the PCI data 50 and the DSI data 51, and are stored into the hard disk device 74.

The above described processes are performed with respect to the whole record information R.

When the above described processes are finished as for the whole record information R, the controller 75 reads out the multiplexed signal Sr from the hard disk device 73, reads out the PCI data signal Spci and the DSI data signal Sdsi as well as other control informations from the hard disk device 74, generates additional information AD, which includes independently each of the PCI data 50, the DSI data 51 and the other control informations, on the basis of these read out signals, and temporarily stores the additional information into the hard disk device 74. This is because there may be control information, which content is determined in dependence upon a generation result of the multiplexed signal Sr among various control informations.

On the other hand, the controller 75 performs a time management for each of the operations of the signal process unit 72, the hard disk device 73 and the hard disk device 74, and reads out the additional information AD, which includes the PCI information signal Spci and the DSI information signal Sdsi, from the hard disk device 74, so that the controller 75 generates and outputs an additional information signal Sa corresponding to the read out additional information AD, and generates and outputs an information selection signal Scc to time-axis-multiplex the multiplexed signal Sr and the additional information signal Sa.

After that, the compressed multiplexed signal Sr and the additional information signal Sa are read out from the hard disk device 73 or 74 on the basis of the information selection signal Scc from the controller 75, and are time-axis-multiplexed by the multiplexer 76 to be outputted as an information added compressed multiplexed signal Sap. The information to be recorded at the stage of this information added compressed multiplexed signal Sap has the physical structure (physical format) as shown in FIG. 1 and the upper stage of FIG. 3, as the control information, the video information and the audio information are multiplexed by the switching operation by use of the information selection signal Scc of the controller 75. And that, the PCI data 50 and the. DSI data 51 are independently included in the navi-pack 41 respectively.

If there exists the sub picture information to be recorded in the informations to be recorded, it is inputted, by other means such as a hard disk device not illustrated, to the signal process unit 72, so that it is processed in the same manner as the video and audio information thereat, so that it is included in the information added compressed multiplexed signal Sap.

After that, the modulator 77 adds an error correction code (ECC), such as a Reed Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

As explained above, according to the recording apparatus SS1 of this embodiment, the audio data 43 quantized by 24 bits is divided into the high order bit data 66 at the high order 16 bits and the low order bit data 67 at the low order 8 bits. Then, two high order bit data 66 and two low order bit data 67 respectively corresponding to the consecutively quantization timings constitute the high order bit data block UB and the low order bit data block DB, respectively, and thereby they are recorded on the DVD 1. Thus, in case that the audio decoder has only the process capacity corresponding to 16 bits at a time of reproducing the audio data 43, it is possible to extract only the high order bit data block UB to D/A-convert the high order bit data 66 included therein to thereby reproduce the audio information.

In case that the audio decoder can perform the D/A-conversion process of 24 bits, it is possible to extract the high order bit data 66 and the low order bit data 67 to thereby perform the D/A conversion with the corresponding high order bit data 66 and low order bit data 67 in one pair.

Further, since each of the high order bit data 66 and the low order bit data 67 has the number of bits equal to an integer multiple of 8, it is possible to simplify the process in the digital signal process of 8 bits.

Furthermore, the recording operation is performed by constituting the high order bit data block UB composed of the high order bit data 66A corresponding to the even-numbered quantization timing and the high order bit data 66B corresponding to the odd-numbered quantization timing, and by constituting the low order bit data block DB composed of the low order bit data 67A corresponding to the even-numbered quantization timing and the low order bit data 67B corresponding to the odd-numbered quantization timing. As a result, if the D/A conversion process of 24 bits can be performed in the audio decoder of the reproducing apparatus, it is possible to reduce a memory capacity required for synthesizing the high order bit data 66 and the low order bit data 67 in the D/A conversion process.

Both of the high order bit data block UB and the low order bit data block DB have sizes of the integer multiples of 16 bits, irrespective of the number of channels included in the audio data 43. As a result, this makes the digital signal process much easier.

(III) Embodiment of Reproducing Apparatus

Next, an embodiment of reproducing apparatus for reproducing the information recorded on the DVD 1 by the above mentioned recording apparatus SS1 will be explained with reference to FIGS. 8 to 10B.

At first, a construction and an operation of the reproducing apparatus as the embodiment is explained with reference to FIG. 8.

As shown in FIG. 8, a reproducing apparatus SS2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 8 only illustrates the portions related to the video and audio reproduction of the reproducing apparatus SS2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits (on the DVD 1, the record information is recorded by forming the information pits) formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the control information which is detected firstly upon loading the DVD 1 and which is related to the whole information recorded on the DVD 1 (e.g. the video manager 2 etc.), the control data 11 of the VTS 3 and the like (refer to FIG. 1). Then, the system buffer 85 outputs the accumulated data as one portion of a control information Sc to the system controller 100, and temporarily stores the DSI data 51 for each navi-pack 41 (refer to FIG. 1) while reproducing the information, to output it as another portion of the control information Sc.

The demultiplexer 86, to which the demodulation signal Sdm is continuously inputted through the stream switch 84, separates the video data 42, the audio data 43, the sub picture data 44 and the PCI data 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio data 43 or the sub picture data 44 in a plurality of different languages are included as the audio or sub picture information. In that case, a desirable language is selected for the audio or sub picture information by a stream selection signal Slc from the system controller 100, so that the audio or sub picture information in the desirable language is outputted to the audio buffer 92 or the sub picture buffer 89.

At this time, the demultiplexer 86 extracts the pack header and the packet header from each pack (including the audio pack AP) and each packet respectively, and outputs the information included therein as a header signal Shd to the system controller 100.

In the audio signal Sad, the audio data 43, which is divided into the audio packs AP as shown in FIG. 3, is included. In each audio pack AP, the additional information AD and a plurality of sample blocks SPB as shown in FIG. 3 are included.

The VBV buffer 87, to which the video signal Sv is,inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method (refer to FIG. 2). Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture data. 44 included in the sub picture signal Ssp with the video data 42 corresponding to the sub picture data 44, and to output it. Then, the sub picture signal Ssp synchronized with the video data 42 is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is ou to the audio decoder 93. Then, a predetermined decoding process e.g. the D/A conversion process etc. is applied thereto to the audio signal Sad, and it is outputted as a decoded audio signal Sadd to a speaker etc. not illustrated.

If it is detected by the system controller 100 that it is necessary to temporarily stop (pause) the audio voice in the reproduction immediately after accessing the desired information, a pause signal Sca is outputted from the system controller 100 to the audio decoder 93, so that the output of the decoded audio signal Sadd is stopped temporarily at the audio decoder 93. This process at the audio decoder 93 will be explained later in detail as for one case where the audio decoder 93 has a D/A-converting process capability of 24 bits, and for another case where it has a D/A-converting process capability of 16 bits.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI data 50, which is included in the PCI signal Spc, with the video data 42, the audio data 43 and the sub picture data 44 corresponding to the PCI data 50, and apply the PCI data 50 to the video data 42, the audio data 43 and the sub picture data 44. Then, from the PCI signal Spc, which is synchronized with the corresponding the video data 42, the audio data 43 or the sub picture data 44 by the PCI buffer 94, high light information included in the PCI data 50 is separated or extracted by the PCI decoder 95, and is outputted as a high light signal Shi to the high light buffer 96. The portion of the PCI data 50 other than the high light information is outputted as a PCI information signal Spci to the system controller 100.

The high-light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. The information to set the value of the register in the system controller 100 is included in this decoded high light signal Shid.

Here, the system controller 100 outputs the aforementioned high light control signal Sch to change the display condition by the high light information, on the basis of the decoded high light signal Shid. At this time, the system controller 100 receive the selecting operation by the input signal Sin from the input unit 98, so as to make effective or valid the selecting operation by use of the menu picture plane based on the high light information on the basis of the effective time interval information, which indicates the effective time interval of the high light information included in the decoded high light signal Shid, and outputs the aforementioned high light control signal Sch.

Further, on the basis of the control information Sc inputted from the system buffer 85, the header signal Shd inputted from the demultiplexer 86, the PCI information signal Spci inputted from the PCI decoder 95 and an input signal Sin inputted from the input unit 98 such as a remote controller, the system controller 100 outputs the aforementioned switch signal Ssw2, a stream selection signal (e.g. a language selection signal) S1c, the pause signal Sca and the high light control signal Sch to correctly perform the reproduction corresponding to those input signals, and also outputs a display signal Sdp to display an operation condition etc. of the reproducing apparatus SS2 to the display unit 99 such as the liquid crystal device.

Furthermore, the system controller 100 outputs a seamless control signal Scs1 corresponding to the track jump process, to the drive controller 101, when it detects by the DSI information signal Sdsi (in the control signal Sc) etc. that it is necessary to perform the track jump process such as a search in order to perform the seamless reproduction.

Then, the drive controller 101, to which the seamless control signal Scs1 is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 8), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scs1, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Next, a process at the audio decoder 93 is explained in detail as for two cases, namely one case in which the audio decoder 93 has the D/A conversion performance of 24 bits and the other case in which the audio decoder 93 has only the D/A conversion performance of 16 bits.

(A) First Embodiment of Audio Decoder

At first, the structure and the operation of the audio decoder 93 having only the D/A conversion performance of 16 bits (hereafter, referred to as an audio decoder 93-1) are explained with reference to FIGS. 9A and 9B.

Figure 9A:
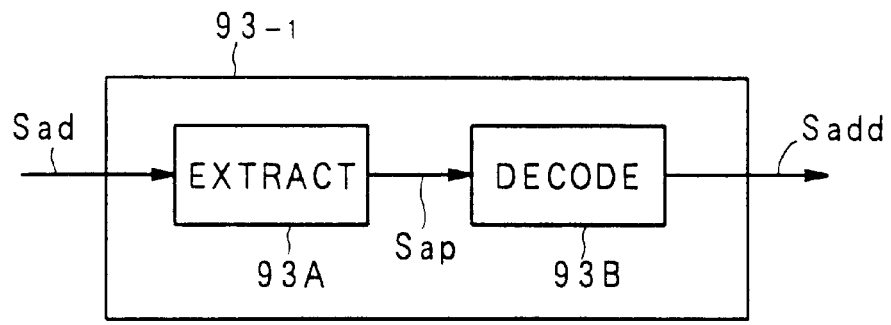
FIG. 9A is a block diagram showing a first embodiment of an audio decoder of the reproducing apparatus in FIG. 8.

As shown in FIG. 9A, in case of the audio decoder 93-1, the audio decoder 93-1 is provided with: an extract section 93A, as one example of a record information block extract means, for extracting only the high order bit data block UB from the audio pack AP included in the inputted audio signal Sad to thereby output as the extracted signal Sap; and a decode section 93B, as one example of a reproduction process means, for D/A-converting the high order bit data 66 included in the extracted signal Sap by 16 bits to thereby output a demodulation audio signal Sad.

Next, the operation is explained with reference to a flow chart shown in FIG. 9B.

Figure 9B:
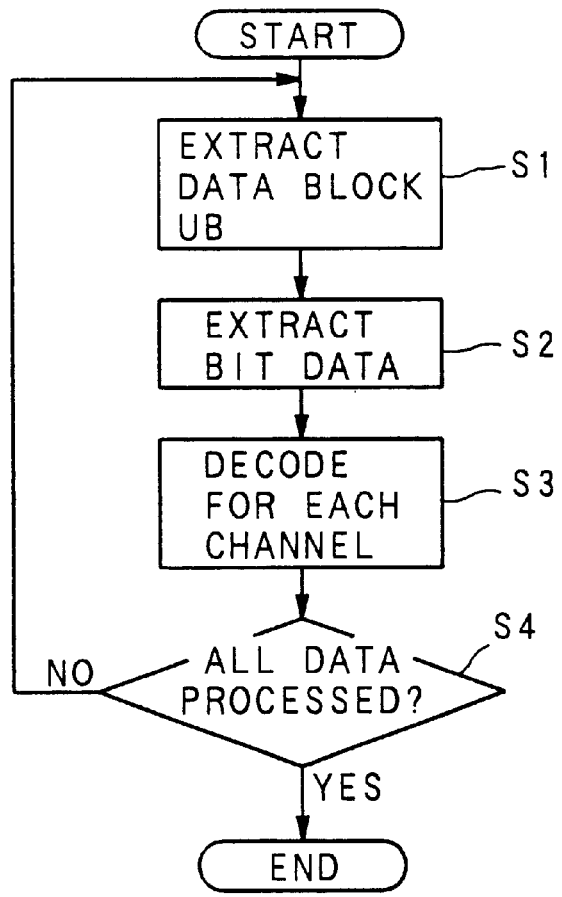
FIG. 9B is a flow chart showing an operation of the first embodiment of the audio decoder in FIG. 9A.

As shown in FIG. 9B, in the audio decoder 93-1, when the audio signal Sad is inputted from the audio buffer 92, the extract section 93A firstly extracts only the high order bit data block UB from the audio pack AP included in the audio signal Sad, to thereby output the extracted signal Sap (Step S1). This extraction of only the high order bit data block UB is performed by calculating, on the basis of the information in relation to the number of quantized bits in the additional information AD included in the audio pack AP and the number of channels included in the audio pack AP, a position of the high order bit data block UB from a top portion of the audio pack AP, and by accordingly extracting only the high order bit data block UB, while discarding the low order bit data block DB (e.g. skipping reading it).

When only the high order bit data block UB is extracted from the audio pack AP (Step S1), the decode section 93B extracts the high order bit data 66 included in the extracted signal Sap and also extracts the channel high order bit data 68 included in the high order bit data 66 for each channel (Step S2). Then, the decode section 93B decodes and D/A-converts the channel high order bit data 68 by 16 bits for each channel, to thereby output the demodulation audio signal Sadd (Step S3).

Then, it is judged whether or not all the data has been processed (Step S4). If processed (Step S4 ; YES), the operation is ended. If not processed (Step S4 ; NO), the flow returns back to the step S1 so as to process a next data.

From the above mentioned operation, only the high order bit data block UB of 16 bits is extracted, and the audio data 43 is D/A-converted. Then, the demodulation audio signal Sadd is outputted for each channel, as audio sound from a corresponding speaker (not shown) or the like.

(B) Second Embodiment of Audio Decoder

Next, the structure and the operation of the audio decoder 93 having the D/A conversion performance of 24 bits (hereafter, referred to as an audio decoder 93-2) are explained with reference to FIGS. 10A and 10B.

Figure 10A:
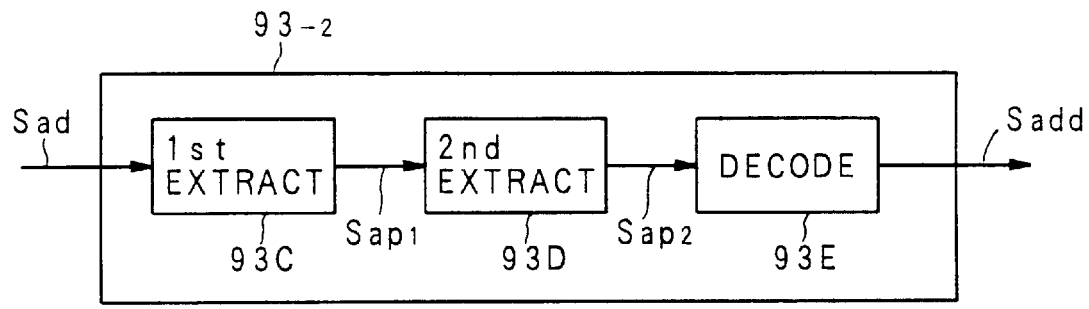
FIG. 10A is a block diagram showing a second embodiment of an audio decoder of the reproducing apparatus in FIG. 8.

As shown in FIG. 10A, in case of the audio decoder 93-2, the audio decoder 93-2 is provided with: a first extract section 93C, as one example of a record information block extract means, for extracting the high order bit data block UB and the low order bit data block DB from the audio pack AP included in the inputted audio signal Sad, to thereby output it as a first extracted signal Sap1; a second extract section 93D, as one example of a quantized record information extract means, for extracting each high order bit data 66 and low order bit data 67 for each channel from the high order bit data block UB and the low order bit data block DB included in the first extracted signal Sap1, to thereby output it as a second extracted signal Sap2; and a decode section 93E, as one example of a reproduction process means, for (i) synthesizing the high order bit data 66A corresponding to the even-numbered quantization timing and the low order bit data 67A corresponding to the even-numbered quantization timing for each channel and synthesizing the high order bit data 66B corresponding to the odd-numbered quantization timing and the low order bit data 67B corresponding to the odd-numbered quantization timing for each channel, among the high order bit data 66 and the low order bit data 67 included in the second extraction signal Sap2, so as to re-constitute the audio data 43 of each 24 bits, and (ii) D/A-converting the re-constituted audio data 43 for each channel, to thereby output the demodulation audio signal Sadd.

Next, the operation is explained with reference to a flow chart shown in FIG. 10B.

Figure 10B:
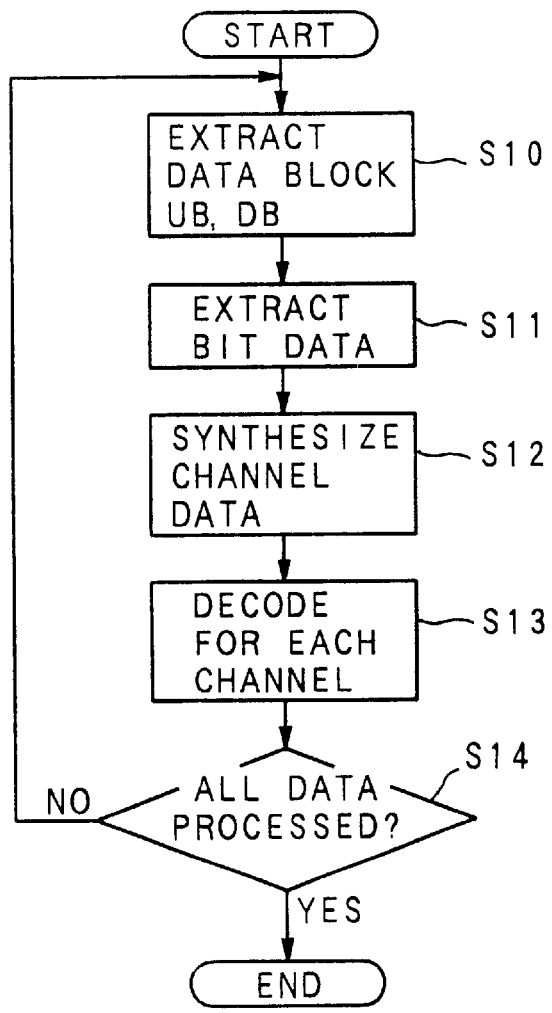
FIG. 10B is a flow chart showing an operation of the second embodiment of the audio decoder in FIG. 10A.

As shown in FIG. 10B, in the audio decoder 93-2, when the audio signal Sad is inputted from the audio buffer 92, the first extract section 93C firstly extracts the high order bit data block UB and the low order bit data block DB from the audio pack AP included in the audio signal Sad, to thereby output it as the first extracted signal Sap1 (Step S10). This extraction of the high order bit data block UB and the low order bit data block DB is performed by calculating, on the basis of the information in relation to the number of quantized bits in the additional information AD included in the audio pack AP and the number of channels included in the audio pack AP, the positions of, the high order bit data block UB and the low order bit data block DB from a top portion of the audio pack AP, and by accordingly extracting the high order bit data block UB and the low order bit data block DB, separately.

When the high order bit data block UB and the low order bit data block DB are extracted from the audio pack AP (Step S10), the second extract section 93D extracts each high order bit data 66 and low order bit data 67 for each channel from the high order bit data block UB and the low order bit data block DB, to thereby output it as the second extracted signal Sap2 (Step S11). In the high order bit data 66 and the low order bit data 67, it is known in advance that the channel high order bit data 68 and the channel low order bit data 69 are included as partitions for each 16 bits and 8 bits. Thus, this extraction for each channel is performed by obtaining the channel high order bit data 68 by dividing from a top portion of the extracted high order bit data 66 for each 16 bits and then extracting it, and also by obtaining the channel low order bit data 69 by dividing from a top portion of the extracted low order bit data 67 for each 8 bits and then extracting it.

When the high order bit data 66 and the low order bit data 67 are extracted for each channel (Step S11), the decode section 93E temporarily stores the extracted high order bit data 66 and low order bit data 67, and accordingly synthesizes the high order bit data 66A corresponding to the even-numbered quantization timing and the low order bit data 67A corresponding to the even-numbered quantization timing for each channel, and also synthesizes the high order bit data 66B corresponding to the odd-numbered quantization timing and the low order bit data 67B corresponding to the odd-numbered quantization timing for each channel, to thereby re-constitute the audio data 43 of each 24 bits (Step S12). This re-constitution of the audio data 43 is performed for each audio frame AF. Then, the re-constituted audio data 43 of 24 bits is decoded and D/A-converted for each channel, and the demodulation audio signal Sadd is outputted (Step S13).

Then, it is judged whether or not all the data has been processed (Step S14). If processed (Step S14 ; YES), the operation is ended. If not processed (Step S14 ; NO), the flow returns back to the step S10 so as to process a next data.

From the above mentioned operations, the high order bit data block UB and the low order bit data block DB are extracted, and the audio data 43 of 24 bits is D/A-converted. Then, the demodulation audio signal Sadd is outputted for each channel, as audio sounds from a corresponding speaker (not shown) or the like.

As explained above, according to the reproducing apparatus SS2 of the embodiment, in the DVD 1, the audio data 43 quantized by 24 bits is divided into the high order bit data 66 at the high order 16 bits and the low order bit data 67 at the low order 8 bits, and the two high order bit data 66 and the two low order bit data 67 respectively corresponding to the consecutively quantization timings constitute the high order bit data block UB and the low order bit data block DB, respectively, and thereby they are recorded. Thus, when the audio decoder has only the process capacity of 16 bits, it is possible to extract only the high order bit data block UB to perform the D/A conversion of the high order bit data 66 included therein to thereby reproduce the audio information.

Alternatively, if the audio decoder can perform the D/A conversion process of 24 bits, it is possible to extract the high order bit data 66 and the low order bit data 67 to thereby perform the D/A conversion with the corresponding high order bit data 66 and low order bit data 67 in one pair.

Further, since each of the high order bit data 66 and the low order bit data 67 has the bit number of the integer multiple of 8, it is possible to simplify the process in the digital signal process of 8 bits.

Furthermore, the recording operation is performed by constituting the high order bit data block UB composed of the high order bit data 66A corresponding to the even-numbered quantization timing and the high order bit data 66B corresponding to the odd-numbered quantization timing, and by constituting the low order bit data block DB composed of the low order bit data 67A corresponding to the even-numbered quantization timing and the low order bit-data 67B corresponding to the odd-numbered quantization timing. As a result, if the audio decoder can perform the D/A conversion process of 24 bits, it is possible to reduce the memory capacity within the audio decoder required for synthesizing the high order bit data 66 and the low order bit data 67 in the D/A converting process.

Both of the high order bit data block UB and the low order bit data block DB have the sizes of the integer multiples of 16 bits, irrespective of the number of channels included in the audio data 43. As a result, this makes the digital signal process much easier.

In each of the above mentioned embodiments, the case is explained in which the audio data 43 is recorded on the DVD 1 by the linear PCI method having the number of quantized bits of 24 bits, and among them, the high order 16 bits are assumed to be the high order bit data 66 and the low order 8 bits are assumed to be the low order bit data 67. However, the present invention is not limited thereto. Instead, the present invention can be applied to a case of the audio data quantized by 8×n (n: natural number) bits, in which the high order 8×n (m<n, m: natural number) bits having large influence on the hearing at a time of reproducing are prescribed to be the high order bit data while the low order 8×r (r=n−m, r: natural number) bits having small influence on the hearing at a time of reproducing are prescribed to be the low order bit data.

The embodiment of the information record medium is not limited to the above mentioned DVD 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information record medium, on which record information to be reproduced by a reproducing apparatus comprising at least a detection means for detecting said record information recorded on said information record medium and a reproduction processing means for performing a reproduction processing of said detected record information is recorded, wherein:

the record information is quantized by 8×n (n is a natural number equal to or more than 2) bits at every quantization timing;

the 8×n bit quantized record information is divided into (i) upper 8×m (m<n and m is a natural number) bit quantized record information (ii) lower 8×(n−m) bit quantized record information;

(i) an upper bit quantized record information block including a plurality of upper bit quantized record information corresponding to consecutive timings and (ii) a lower bit quantized record information block including a plurality of lower bit quantized record information corresponding to the same consecutive quantization timings are multiplexed adjacent to each other.

2. An information record medium according to claim 1, wherein:

the record information comprises audio information;

the record information is quantized by 24 bits; and a portion at upper 16 bits of the quantized record information, which is quantized at one quantization timing, is prescribed as the upper bit quantized record information, and a portion at lower 8 bits of the quantized record information, which is quantized at the one quantization timing, is prescribed as the lower bit quantized record information.

3. An information record medium according to claim 1, wherein the upper bit quantized record information block is constituted of two upper bit quantized record informations corresponding to consecutive two quantization timings, and the lower bit quantized record information block is constituted of two lower bit quantized record informations corresponding to the consecutive two quantization timings, to which the two upper bit quantized record informations constituting the upper bit quantized record information block correspond.

4. An information reproducing apparatus for reproducing record information from an information record medium, wherein:

the record information is quantized by 8×n (n is a natural number equal to or more than 2) bits at every quantization timing;

the 8×n bit quantized record information is divided into (i) upper 8×m (m<n and m is a natural number) bit quantized record information and (ii) lower 8×(n−m) bit quantized record information;

(i) an upper bit quantized record information block including a plurality of upper bit quantized record information corresponding to consecutive quantization timings and (ii) a lower bit quantized record information block including a plurality of lower bit quantized record information corresponding to the same consecutive quantization timings are multiplexed adjacent to each other, the apparatus comprising:

a detection and demodulation means for detecting and demodulating information recorded on the information record medium, thereby obtaining a demodulation signal;

a record information block extract means for extracting only the upper bit quantized record information block from the demodulation signal;

a reproduction processing means for performing a reproduction processing of the upper bit quantized record information included in the extracted upper bit quantized record information block, thereby outputting the record information.

5. An information reproducing apparatus according to claim 4, wherein:

the record information comprises audio information;

the record information is quantized by 24 bits;

a portion at upper 16 bits of the quantized record information, which is quantized at one quantization timing, is prescribed as the upper bit quantized record information, and a portion at lower 8 bits of the quantized record information, which is quantized at the one quantization timing, is prescribed as the lower bit quantized record information; and the reproduction process means performs the reproduction process of the portion at the upper 16 bits of the quantized record information.

6. An information reproducing apparatus according to claim 4, wherein:

the upper bit quantized record information block is constituted of two upper bit quantized record informations corresponding to consecutive two quantization timings, and the lower bit quantized record information block is constituted of two lower bit quantized record informations corresponding to the consecutive two quantization timings, to which the two upper bit quantized record informations constituting the upper bit quantized record information block correspond; and the record information block extract means extracts the two upper bit quantized record informations as the upper bit quantized record information block.

7. An information reproducing apparatus for reproducing record information from an information recording medium, wherein:

the record information is quantized by 8×n (n is a natural number equal to or more than 2) bits at every quantization timing;

the 8×n bit quantized record information is divided into (i) upper 8×m (m<n and m is a natural number) bit quantized record information and (ii) lower 8×(n−m) bit quantized record information;

(i) an upper bit quantized record information block including a plurality of upper bit quantized record information corresponding to consecutive quantization timings and (ii) a lower bit quantized record information block including a plurality of lower bit quantized record information corresponding to the same consecutive quantization timings are multiplexed adjacent to each other, the apparatus comprising:

a detection and demodulation means for detecting and demodulating information recorded on the recording medium, thereby obtaining a demodulation signal;

a record information block extract means for extracting the upper bit quantized record information block and the lower bit quantized record information block from the demodulation signal;

a reproduction process means for synthesizing and performing a reproduction process of the upper bit quantized record information included in the extracted upper bit quantized record information block and lower bit quantized record information included in the extracted lower bit quantized record information block, thereby outputting the record information.

8. An information reproducing apparatus according to claim 7 wherein:

the record information comprises audio information;

the record information is quantized by 24 bits;

a portion at upper 16 bits of the quantized record information, which is quantized at one quantization timing, is prescribed as the upper bit quantized record information, and a portion at lower 8 bits of the quantized record information, which is quantized at the one quantization timing, is prescribed as the lower bit quantized record information.

9. An information reproducing apparatus according to claim 7, wherein:

the upper bit quantized record information block is constituted of two upper bit quantized record informations corresponding to consecutive two quantization timings, and the lower bit quantized record information block is constituted of two lower bit quantized record informations corresponding to the consecutive two quantization timings, to which the two upper bit quantized record informations constituting the upper bit quantized record information block correspond; and the record information block extract means extracts the two upper bit quantized record informations and the two lower bit quantized record informations.

10. An information recording apparatus for recording record information on an information record medium, comprising:

a quantize means for quantizing record information to be recorded, by 8×n (n is a natural number equal to or more than 2) bits at every quantization timing, thereby outputting quantized record information;

a divide means for dividing the 8×n bit quantized record information into (i) upper 8×m (m<n and m is a natural number) bit quantized record information and (ii) lower 8×(n−m) bit quantized record information;

a multiplexed record information generation means for generating, on the basis of the divided upper bit quantized record information and divided lower bit quantized record information, (i) an upper bit quantized record information block including a plurality of upper bit quantized record information corresponding to consecutive quantization timings and (ii) a lower bit quantized record information block including a plurality of lower bit quantized record information corresponding to the same consecutive quantization timings, and for multiplexing the upper bit quantized record information block and the lower bit quantized record information block adjacent to each other, thereby generating multiplexed record information; and a record means for recording the multiplexed record information onto the information record medium.

11. An information recording apparatus according to claim 10, wherein:

the record information comprises audio information;

the quantize means quantizes the record information by 24 bits; and the divide means prescribes a portion at upper 16 bits of the quantized record information, which is quantized at one quantization timing, as the upper bit quantized record information, and prescribes a portion at lower 8 bits of the quantized record information, which is quantized at the one quantization timing, as the lower bit quantized record information.

12. An information recording apparatus according to claim 10, wherein the multiplexed record information generation means generates the upper bit quantized record information block of two upper bit quantized record informations corresponding to consecutive two quantization timings, and also generates the lower bit quantized record information block of two lower bit quantized record informations corresponding to the consecutive two quantization timings, to which the two upper bit quantized record informations constituting the upper bit quantized record information block correspond.

13. A method of reproducing record information from an information record medium, comprising the steps of:

detecting said record information recorded on said information record medium;

performing a reproduction processing of said detected record information, wherein:

the record information is quantized by 8×n (n is a natural number equal to or more than 2) bits at every quantization timing;

the 8×n bit quantized record information is divided into (i) upper 8×m (m<n and m is a natural number) bit quantized record information and (ii) lower 8×(n−m) bit quantized record information;

(i) an upper bit quantized record information block including a plurality of upper bit quantized record information corresponding to consecutive quantization timings and (ii) a lower bit quantized record information block including a plurality of lower bit quantized record information corresponding to the same consecutive quantization timings are multiplexed adjacent to each other.

14. The method according to claim 13, wherein:

the record information comprises audio information;

the record information is quantized by 24 bits; and a portion at upper 16 bits of the quantized record information, which is quantized at one quantization timing, is prescribed as the upper bit quantized record information, and a portion at lower 8 bits of the quantized record information, which is quantized at the one quantization timing, is prescribed as the lower bit quantized record information.

15. The method according to claim 13, wherein the upper bit quantized record information block is constituted of two upper bit quantized record informations corresponding to consecutive two quantization timings, and the lower bit quantized record information block is constituted of two lower bit quantized record informations corresponding to the consecutive two quantization timings, to which the two upper bit quantized record informations constituting the upper bit quantized record information block correspond.

16. A method of reproducing record information from an information record medium, wherein:

the record information is quantized by 8×n (n is a natural number equal to or more than 2) bits at every quantization timing;

the 8×n bit quantized record information is divided into (i) upper 8×(m<n and m is a natural number) bit quantized record information and (ii) lower 8×(n−m) bit quantized record information;

(i) an upper bit quantized record information block including a plurality of upper bit quantized record information corresponding to consecutive quantization timings and (ii) a lower bit quantized record information block including a plurality of lower bit quantized record information corresponding to the same consecutive quantization timings are multiplexed adjacent to each other, the method comprising the steps of:

detecting and demodulating information recorded on the information record medium, thereby obtaining a demodulation signal;

extracting only the upper bit quantized record information block from the demodulation signal; and performing a reproduction processing of the upper bit quantized record information included in the extracted upper bit quantized record information block, thereby outputting the record information.

17. The method according to claims 16, wherein:

the record information comprises audio information;

the record information is quantized by 24 bits;

a portion at upper 16 bits of the quantized record information, which is quantized at one quantization timing, is prescribed as the upper bit quantized record information, and a portion at lower 8 bits of the quantized record information, which is quantized at the one quantization timing, is prescribed as the lower bit quantized record information; and the step of performing the reproduction processing performs the reproduction processing of the portion at the upper 16 bits of the quantized record information.

18. The method according to claim 16, wherein:

the upper bit quantized record information block is constituted of two upper bit quantized record informations corresponding to consecutive two quantization timings, and the lower bit quantized record information block is constituted of two lower bit quantized record informations corresponding to the consecutive two quantization timings, to which the two upper bit quantized record informations constituting the upper bit quantized record information block correspond; and the step of extracting extracts the two upper bit quantized record informations as the upper bit quantized record information block.

19. A method of reproducing record information from an information recording medium, wherein:

the record information is quantized by 8×(n is a natural number equal to or more than 2) bits at every quantization timing;

the 8×bit quantized record information is divided into (i) upper 8×(m<n and m is a natural number) bit quantized record information and (ii) lower 8×(n−m) bit quantized record information;

(i) an upper bit quantized record information block including a plurality of upper bit quantized record information corresponding to consecutive quantization timings and (ii) a lower bit quantized record information block including a plurality of lower bit quantized record information corresponding to the same consecutive quantization timings are multiplexed adjacent to each other, the method comprising the steps of:

detecting and demodulating information recorded on the recording medium, thereby obtaining a demodulation signal;

extracting the upper bit quantized record information block and the lower bit quantized record information block from the demodulation signal; and synthesizing and performing a reproduction process of the upper bit quantized record information included in the extracted upper bit quantized record information block and lower bit quantized record information included in the extracted lower bit quantized record information block, thereby outputting the record information.

20. The method according to claim 19, wherein:

the record information comprises audio information;

the record information is quantized by 24 bits;

a portion at upper 16 bits of the quantized record information, which is quantized at one quantization timing, is prescribed as the upper bit quantized record information, and a portion at lower 8 bits of the quantized record information, which is quantized at the one quantization timing, is prescribed as the lower bit quantized record information.

21. The method according to claim 19, wherein:

the upper bit quantized record information block is constituted of two upper bit quantized record informations corresponding to consecutive two quantization timings, and the lower bit quantized record information block is constituted of two lower bit quantized record informations corresponding to the consecutive two quantization timings, to which the two upper bit quantized record informations constituting the upper bit quantized record information block correspond; and the step of extracting extracts the two upper bit quantized record informations and the two lower bit quantized record informations.

22. A method of recording record information on an information record medium, comprising the steps of:

quantizing record information to be recorded, by 8×n (n is a natural number equal to or more than 2) bits at every quantization timing, thereby outputting quantized record information;

dividing the 8×n bit quantized record information into (i) upper 8×(m<n and m is a natural number) bit quantized record information and (ii) lower 8×(n−m) bit quantized record information;

generating, on the basis of the divided upper bit quantized record information and divided lower bit quantized record information, (i) an upper bit quantized record information block including a plurality of upper bit quantized record information corresponding to consecutive quantization timings and (ii) a lower bit quantized record information block including a plurality of lower bit quantized record information corresponding to the same consecutive quantization timings, and multiplexing the upper bit quantized record information block and the lower bit quantized record information block adjacent to each other, thereby generating multiplexed record information; and recording the multiplexed record information onto the information record medium.

23. The method according to claim 22, wherein:

the record information comprises audio information;

the step of quantizing quantizes the record information by 24 bits; and the step of dividing prescribes a portion at upper 16 bits of the quantized record information, which is quantized at one quantization timing, as the upper bit quantized record information, and prescribes a portion at lower 8 bits of the quantized record information, which is quantized at the one quantization timing, as the lower bit quantized record information.

24. The method according to claim 22, wherein the step of generating generates the upper bit quantized record information block of two upper bit quantized record informations corresponding to consecutive two quantization timings, and also generates the lower bit quantized record information block of two lower bit quantized record informations corresponding to the consecutive two quantization timings, to which the two upper bit quantized record informations constituting the upper bit quantized record information block correspond.

* * * * *

UNITED STATES PATENT AND TRADEMARK OFFICE
CERTIFICATE OF CORRECTION

| | | |
|---|---|---|
| PATENT NO. | : 6,778,761 B1 | Page 1 of 1 |
| APPLICATION NO. | : 09/452889 | |
| DATED | : August 17, 2004 | |
| INVENTOR(S) | : Yoshiaki Moriyama et al. | |

It is certified that error appears in the above-identified patent and that said Letters Patent is hereby corrected as shown below:

Title Page Item (63) "Related U.S. Application Data" is added to the front page of the above-identified patent, with the following text: "Continuation of application no. 08/819,011, filed on March 17, 1997, now U.S. Patent No. 6,014,495."

At col. 1, beginning at line 5, after the Title, the following text is added:
"CROSS REFERENCE TO RELATED APPLICATIONS
This is a continuation of copending application serial no. 08/819,011, filed on March 17, 1997, now U.S. Patent No. 6,014,495."

Signed and Sealed this

Third Day of August, 2010

David J. Kappos
*Director of the United States Patent and Trademark Office*